(12) United States Patent  (10) Patent No.: US 8,366,328 B2
Chen et al. (45) Date of Patent: Feb. 5, 2013

(54) ALIGNMENT-IMPROVED OPTICAL-FIBER MECHANICAL SPLICER

(75) Inventors: David Zhi Chen, Richardson, TX (US); George N. Bell, Stormville, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 211 days.

(21) Appl. No.: 12/973,230

(22) Filed: Dec. 20, 2010

(65) Prior Publication Data

US 2012/0155812 A1 Jun. 21, 2012

(51) Int. Cl.
*G02B 6/255* (2006.01)
(52) U.S. Cl. .................. 385/95; 385/98; 385/99
(58) Field of Classification Search .................. 385/83, 385/95–99, 134, 136, 137
See application file for complete search history.

(56) References Cited

U.S. PATENT DOCUMENTS

| | | | | |
|---|---|---|---|---|
| 4,352,542 A * | 10/1982 | Tydings | ........................... | 385/70 |
| 4,435,038 A * | 3/1984 | Soes et al. | ........................ | 385/70 |
| 4,593,971 A * | 6/1986 | Clement et al. | ................ | 385/64 |
| 4,668,045 A * | 5/1987 | Melman et al. | ................ | 385/82 |
| 5,102,212 A * | 4/1992 | Patterson | ........................ | 385/98 |
| 5,189,717 A * | 2/1993 | Larson et al. | .................. | 385/95 |
| 7,454,117 B2 * | 11/2008 | Carpenter et al. | ............ | 385/137 |
| 2010/0046892 A1 * | 2/2010 | Milette et al. | ................... | 385/83 |

* cited by examiner

*Primary Examiner* — Ellen Kim

(57) ABSTRACT

Apparatus and methodology for mechanically splicing two optical fibers of equal or different diameters. Instead of flat V-groove structure for holding the optical fibers to be spliced, embodiments of the present invention use a concave-walled channel to better align two optical fibers if they have different diameters. The cover holding the fibers in place in the concave channel is similarly curved. The improved alignment results in more area overlap between end surfaces of the two optical fibers to be spliced. This reduces insertion loss by 0.1 dB or better, at the splice junction and, therefore, improves light signal transmission. The radius of curvature of the concave structure can be approximately two to three times the radius of the optical fibers being spliced.

11 Claims, 4 Drawing Sheets

ALIGNMENT-IMPROVED OPTICAL-FIBER MECHANICAL SPLICER

BACKGROUND

A fiber optic cable contains multiple, mutually-isolated, coated glass fibers. Sometimes the fibers in one cable are not identical in each of their diameters to the fibers in a second cable. Different optical fibers that meet different performance standards may not be identically manufactured which may result in slightly different optical fiber diameters. Different standard specifications for optical fibers are published by the International Telecommunication Union-Telecommunication Standardization Sector (ITU-T). These specifications vary from the ITU-T G.652 specification to the ITU-T G.657 specification, with some eighteen or more specifications or sub-specifications in between which may result in optical fiber diameter variations.

A mismatch in diameter between two optical fibers, for any reason, can result in significant insertion loss (signal loss) at a splice junction between the two optical fibers if their cross-sections at the splice junction do not optimally overlap. Even small variations in diameters on the order of 10% can be problematic. Consequently, when splicing optical fibers with different diameters, for example, by technicians working on a fiber optic cable installation at a construction site of a multi-dwelling unit (MDU), the technicians try to align the fibers optimally to mitigate insertion loss at the splice junction.

Different splicing techniques offer different alignment capabilities. For example, a fusion splicer can make use of photonics for alignment purposes, and thereby achieve a mode-field diameter alignment, a fiber-core alignment or a fiber cladding alignment, each of which probably provides a better overlap between the spliced optical fibers' cross sections as compared with the overlap achievable by a mechanical splicer. The mechanical splicer generally can not align two fibers as well as a fusion splicer because it is limited to geometrical/mechanical alignment constraints only.

But, a mechanical splicing technique has advantages; it is much less costly and easier to use than a fusion splicing technique. The latter requires a relatively expensive splicing instrument, access to electrical power which is sometimes not readily available during initial phases of building construction, more highly trained technicians, and more money for repairs if the fusion splicer is dropped or otherwise damaged during use. In a cable installation for a multi-dwelling unit (MDU) such as a large apartment building, the large number of required splices makes fusion splicing cost prohibitive. For that reason, and because of the other factors noted above, it would be preferable to use mechanical splicing, provided that misalignments resulting from mechanical splicing of optical fibers with unequal diameters could be mitigated.

There are different kinds of mechanical splicers, but a current widespread design uses a "V" groove as a channel to hold two optical fibers to be spliced together. The walls of the V groove are flat, and a cover pressing down on top of the open V channel presses against at least the larger of two unequally-diametered fibers. Because of geometry and gravitational force, the smaller diameter optical fiber is displaced downward in the direction of the bottom of the V channel, relative to the supported location of the larger diameter fiber. Thus, there is non-concentric overlap between the cross-sections of these two fibers at their splice junction, as a function of diameter difference. A portion of the cross-section of the smaller fiber hangs below the bottom of the cross-section of the larger fiber, or if the portable splicer is momentarily rotated by the technician on the job site for whatever reason, where either of the normally-up corners of the V-channel is momentarily located in a down position, a like portion of the cross-section of the smaller fiber could then protrude beyond the periphery of the larger fiber in the direction of that momentarily down corner.

Applicant provides an improvement to this V groove mechanical splice design by moving the cross-sections towards concentricity and thereby achieving increased cross sectional overlap and reduced insertion loss. Insertion loss has been reduced by as much as 0.1 dB-0.2 dB from use of Applicant's improvement, which shall be appreciated as being significant by those of skill in the art.

DETAILED DESCRIPTION OF PREFERRED EMBODIMENTS

Figure 1:
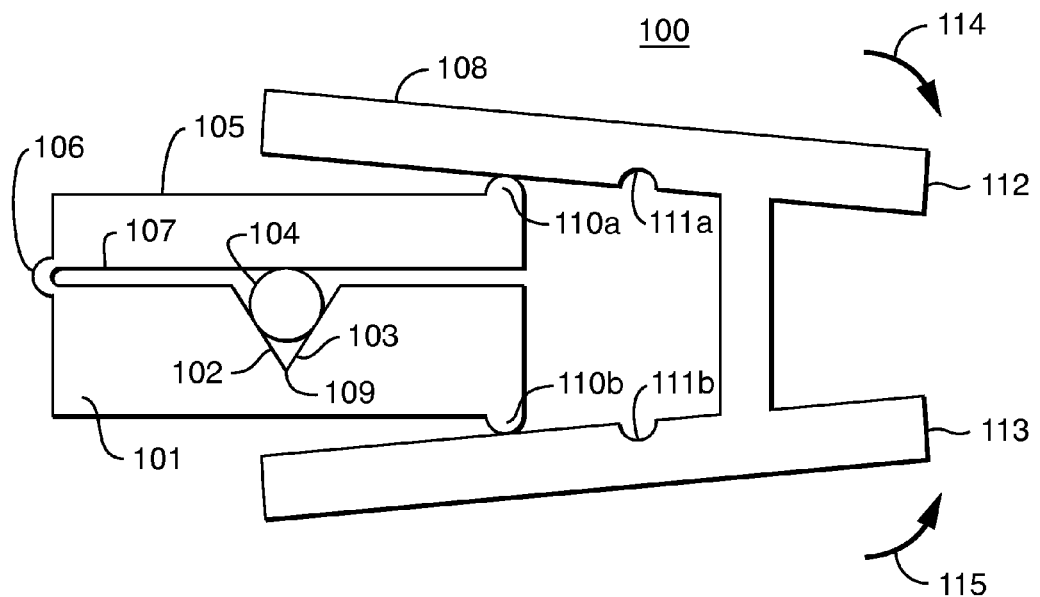
FIG. 1 is an exemplary end-view schematic diagram of a prior art V-groove mechanical splicer.

In this description, the same reference numeral in different Figs. refers to the same entity. Otherwise, reference numerals of each Fig. start with the same number as the number of that Fig. For example, FIG. 3 has numerals in the "300" category and FIG. 4 has numerals in the "400" category, etc.

In overview, a V-groove mechanical splicer for splicing optical fibers relies entirely on mechanical constraints to hold the optical fibers in place during the splicing operation. Before the actual splicing takes place, the coated optical fibers need to be properly stripped, cleaned and cleaved which is standard procedure. Cleaving is performed in an optical fiber cleaver, which cuts the ends of the optical fibers in a manner that provides flat and smooth end glass surfaces. These surfaces are either orthogonal to their respective longitudinal axes or are angled at other than 90 degrees to their respective longitudinal axes such as, e.g., 8 degrees, and perfectly mated to each other via alignment and/or keying techniques. An optical gel material that matches the optical properties of the glass of the fibers is used at the splice junction to reduce optical signal reflection and enhance optical transmission.

After preparation of the fibers as described above, embodiments of the present invention can be used. These embodiments include apparatus utilized by qualified technicians for splicing together two optical fibers of equal or unequal diameters. The apparatus has a closed splice-junction support channel. The closed channel is configured with three curved, concave surfaces which, if the optical fiber diameters are unequal, together hold or grip at least the larger of the two optical fibers therein. The three concave surfaces are utilized to increase overlap between cross-sections of the two optical fibers at their splice junction with concomitant reduction of insertion loss generated by the splice junction. This improved alignment between the two optical fibers at their splice junction results from usage of embodiments of the present invention to cause relative radial displacement of the two optical fibers in a direction towards a state of optical fiber concentricity or coaxiality. (If two optical fibers have equal diameters they would be likely to achieve actual concentricity or coaxiality when spliced together.)

This increase in overlap is measured with respect to results obtained from similar apparatus also having a closed splice junction support channel, but configured with three standard flat surfaces. The improved curvilinear, or arcuate, surfaces in embodiments of the present invention inherently and mechanically increase cross-sectional overlap and reduce signal loss at the splice interface as compared with results obtained from apparatus having optical fiber holding channels configured from flat surfaces.

The closed channel of a preferred embodiment of the present invention is configured from two curved restraining walls formed in the body of the mechanical splicer, and a curved cover (i.e., a curved ceiling). Instead of a curved cover, an arc formed within a portion of the cover (a "cover arc") can be used. The cover is hinged from the body of the splicer and closes upon, or towards, the body of the splicer from which the two curved restraining walls are formed. The two curved restraining walls have substantially equal radii of curvature and meet together at one of their ends to form a linear channel. The channel's curvature, as viewed from inside the channel, is concave—the channel has concave walls for supporting two separate optical fibers therein. The channel is closed when either the curved cover or the cover arc, both also concave as viewed from inside the channel, and hinged at one end of the cover from the splicer body or chassis, is locked into its closed position. The cover or the cover arc has a radius of curvature that is equal to the radii of curvature of the walls. The cover or the cover arc is configured to firmly hold both inserted fibers having identical diameters, or the one of the two inserted fibers having the larger of the two unequal diameters, within concave constraints of both the channel and the cover or the cover arc when the cover is locked closed.

The radii of curvature of the walls and ceiling cover are equal to each other and are approximately two to three times the radius of curvature of the enveloped optical fibers, but these are not absolute limits and other radii of curvature of the walls and ceiling, larger or smaller, can be used. The body or chassis of the mechanical splicer of the preferred embodiments, including the walls and cover, is made from hard and inflexible material but not as hard as the glass which it envelopes. That material should be softer than the glass to avoid damaging the glass in the event that the glass happens to be larger than the space in the closed channel. For example, the body or chassis of embodiments of the present invention can be configured from metal such as aluminum and/or hard plastic.

FIG. 1 is an end view of prior art V-groove mechanical splicing apparatus 100, showing various detail in schematic format. Body or chassis 101 has a V-groove or channel formed in it by flat side walls 102 and 103 which are shown on edge and which meet together at a line shown on end and representing channel bottom 109. Cylindrically-shaped optical fiber 104 is shown on end as a circle resting in the V-groove. Another optical fiber to which optical fiber 104 shall be spliced also lies in the groove, hidden behind optical fiber 104 and is not shown in this Fig. The other optical fiber is also circular in cross-section and is equal in diameter to the diameter of optical fiber 104. If the other optical fiber, not shown, were smaller in diameter than optical fiber 104, a portion of it would have been visible below the bottom of optical fiber 104. This shall be explained in detail in connection with FIGS. 3 and 4.

Cover 105 is shown connected to body 101 by way of hinging mechanism 106 at the left hand side of the apparatus. Cover 105 has a flat inner surface 107 shown on edge in FIG. 1. When cover 105 is rotated clockwise into a closed position via hinge 106, flat surface 107 closes down upon optical glass fiber 104. Cover 105 is held in place by way of hinge 106 at its left in cooperation with resilient clamping or locking means 108 shown at its right which can be made from metal such as spring steel.

In clamp 108, control ends 112 and 113 are separated from each other by support brace 116 and can be squeezed together in directions 114 and 115 to open the mouth of the clamp. Depressions 111a and 111b, formed in the clamp, interlock with lip 110a on the end of the top of cover 105 and lip 110b on the end of the bottom of body 101, respectively, when the control ends are released. The reverse procedure is performed to remove the clamp.

When cover 105 is locked closed, optical fiber 104 and the other optical fiber, not shown, are held in a closed, longitudinally-linear channel comprised of three flat walls 102, 103 and 107. Physical contact between the cylindrical surfaces of the two optical glass fibers and the three flat surfaces of the closed linear channel is made along three straight lines (not shown), each being parallel to the axes of rotation of the fibers, the lines being substantially equidistant from each other. The end view of that closed linear channel would appear as an equilateral triangle, or substantially close thereto. Apparatus designed in accordance with this principle of operation is commercially available. For example, 3M Company, Senko Co., Ltd and Corning Incorporated are three sources of commercially-available flat V groove alignment splicer models.

Figure 2:
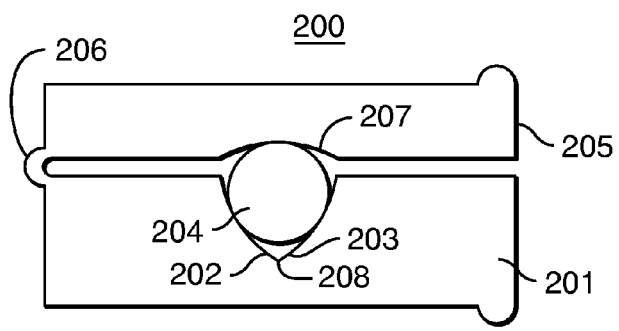
FIG. 2 is an exemplary end-view schematic diagram of apparatus configured in accordance with principles of the present invention.

FIG. 2 is an exemplary end-view schematic diagram of apparatus 200 configured in accordance with principles of the present invention. Body or chassis 201 has a concave channel formed in it by curved side walls 202 and 203 having identical radii of curvature. The side walls are shown on edge and meet together at a line shown on end and representing channel bottom 208. Cylindrically-shaped optical fiber 204 is shown on end as a circle resting in the concave channel. Another optical fiber to which optical fiber 204 shall be spliced also lies in the groove, hidden behind optical fiber 204 and is not shown in this Fig. The other optical fiber is also circular in cross-section and is equal in diameter to the diameter of optical fiber 204. If the other optical fiber, not shown, were smaller in diameter than optical fiber 204, a portion of it would have been visible below the bottom of optical fiber 204. This shall be explained in detail in connection with FIGS. 3 and 4.

Cover 205 is shown connected to body 201 by way of hinging mechanism 206 at the left hand side of the apparatus. Cover 205 has a curved inner surface or cover arc 207 having the same radius of curvature as those of side walls 202 and 203, and is shown on edge in FIG. 2. When cover 205 is rotated clockwise into a closed position via hinge 206, curved surface 207 closes down upon optical glass fiber 204. Cover 205 is held in place by way of hinge 206 at its left in cooperation with a clamping or locking means not shown in this Fig. to enhance clarity of presentation, but which is similar to clamping mechanism 108 shown in FIG. 1. When cover 205 is locked closed, optical fiber 204 and the other optical fiber, not shown, are held in a closed, longitudinally-linear channel comprised of three concave walls 202, 203 and 207. Physical contact between the outer surfaces of the two optical glass fibers and the three curved surfaces of the closed linear channel is made along three straight lines (not shown), each being parallel to the axes of rotation of the Fibers. Because the radii of curvature of the two side walls and the radii of curvature of the cover arc are substantially the same, the lines of contact between the glass fibers and the curved walls are substantially equidistant from each other. The gap between the lower surface of cover 205 associated with cover arc 207 and the upper surface of body 201 can be larger or smaller than the gap shown; the actual gap distance is a function of diameter, or radius, of optical fiber 204 relative to radius of curvature of 202, 203 and 207.

The end view of that closed linear channel appears as three equal arc lengths of circular geometry. That end view would approach that of an equilateral triangle, having sixty degrees per angle, as the radius of curvature of each of those arcs was simultaneously increased, in a mathematical limit sense, to a distance of infinity. In a preferred embodiment, the radius of curvature of the three circular arcs is the same and fixed at approximately two to three times the radius of curvature of the encapsulated optical fiber, although larger and smaller radii of curvature can be used.

Figure 3:
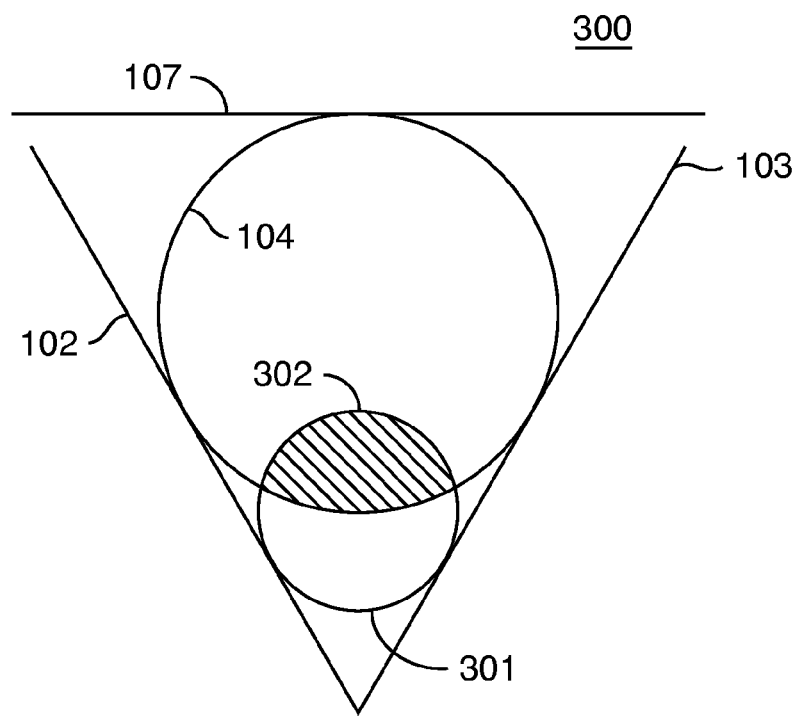
FIG. 3 is an enlarged end view of a portion of FIG. 1 showing two optical fibers having dramatically different diameters for illustrative purposes.

FIG. 3 is an enlarged end view 300 of a portion of FIG. 1. However, instead of depicting two optical fibers having the same radius or diameter with one optical fiber hidden behind the other as presented in FIG. 1, FIG. 3 shows two optical fibers 104 and 302 having dramatically different diameters. This diameter difference is greater than that which is expected to occur in actual practice, but is presented herein, along with FIG. 4, to clearly illustrate the principle of operation of the present invention as well as the advantages of the present embodiment over the prior art embodiment.

FIG. 3 shows end views of flat surfaces 102 and 103 as depicted in FIG. 1 and also shows an end view of optical fiber 104 as it rests in the V groove upon side walls 102 and 103. Cover 105 (FIG. 1) is assumed to be in a closed position wherefore the end view of flat surface 107 is a straight and horizontal line, as shown, tangent to the top-most location of optical fiber 104. Significantly, smaller-diameter optical fiber 301, shown on end, is located in the V-groove and is partially visible. The cross-hatched area 302 represents the effective splice junction overlap between the two optical fibers. Although this may not be a realistic fiberoptic match-up, it can be seen that with the dramatically different diameters depicted, cross-hatched area 302 is less than half of the cross-sectional area of optical fiber 301. In the mis-matched optical fiber circumstance shown, there would be substantial insertion loss at the splice junction of these two optical fibers.

Figure 4:
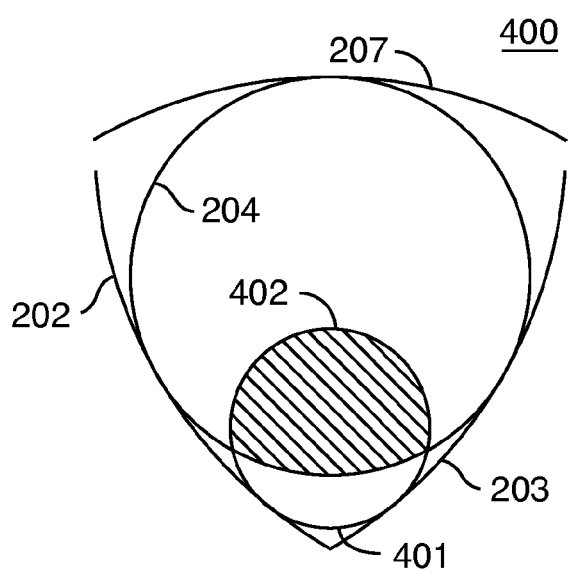
FIG. 4 is an enlarged end view of a portion of FIG. 2 showing two optical fibers with diameters equal to those in FIG. 3, for comparison purposes.

FIG. 4 is an enlarged end view 400 of a portion of FIG. 2 showing two optical fibers with diameters equal to those of the optical fibers in FIG. 3, for comparison purposes. FIG. 4 shows end views of curved surfaces 202 and 203 as depicted in FIG. 2 and also shows an end view of optical fiber 204 as it rests in the concave channel upon side walls 202 and 203. Cover 205 (FIG. 2) is assumed to be in a closed position wherefore the end view of curved surface 207 is a curved line, as shown, tangent to the top-most location of optical fiber 204. The radii of curvature of surfaces 202, 203 and 207 are all equal to each other and, in FIG. 4, each is depicted as being three times the radius of curvature of optical fiber 204. Although the radii of curvature are the same in a particular embodiment of the present invention, they need not be limited to a thrice constraint relative to the optical fiber being spliced, and the same larger, or smaller, radii of curvature for each of surfaces 202, 203 and 207 can be used and are intended to be covered by the appended claims.

Smaller-diameter optical fiber 401, shown on end and equal in diameter to optical fiber 301 of FIG. 3, is resting in the concave channel formed by walls 202 and 203 and is, again, partially visible but, significantly, is less partially-visible than in FIG. 3. The cross-hatched area 402 represents the effective splice junction overlap between the two optical fibers and this means that there is more overlap depicted in FIG. 4 than in FIG. 3. It further appears that cross-hatched area 402 is more than half of the cross-sectional area of optical fiber 401 as compared with that of FIG. 3 which was less than half of the cross-sectional area of same-sized optical fiber 301. It further appears that the cross-hatched area in FIG. 4 is approximately twice as large as that of FIG. 3. Although there would still be some insertion loss at the splice junction of these two optical fibers in FIG. 4, such loss would be much less than that depicted in FIG. 3.

Thus, when any two optical fibers of different diameter are mechanically spliced in an embodiment of the present invention, there would always be less insertion loss at that splice junction as compared with the loss at a splice junction of those same two fibers as created by a prior art mechanical V-groove splicer.

Figure 5:
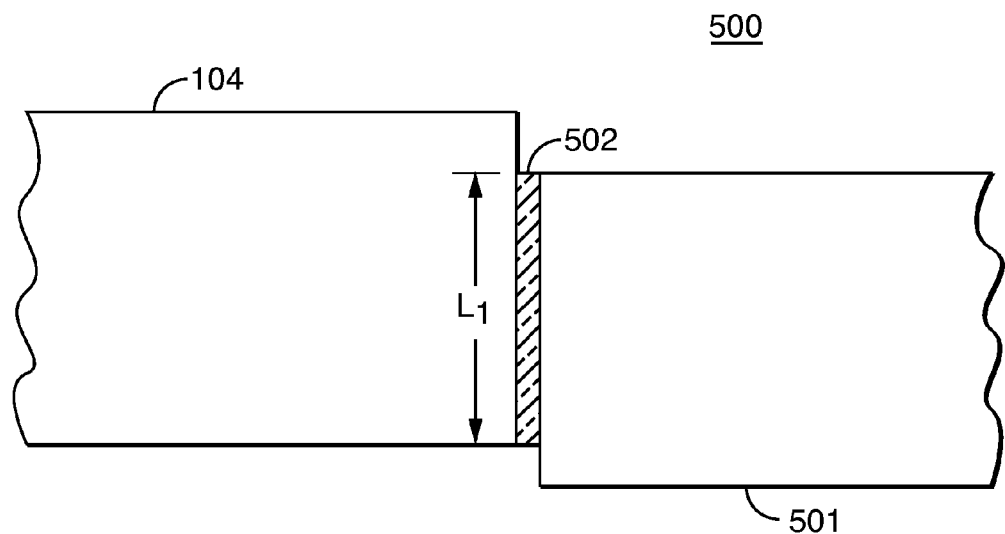
FIG. 5 is an exemplary schematic diagram depicting a longitudinal view of two optical fibers with unequal diameters as they might be supported by apparatus of FIG. 1; and, FIG. 6 is an exemplary schematic diagram depicting a longitudinal view of the two optical fibers of FIG. 5 as they might be supported by apparatus of FIG. 2.

FIG. 5 is an exemplary schematic diagram depicting a longitudinal view 500 of two optical fibers 104 and 501 with unequal diameters as they might be supported by apparatus of prior art FIG. 1. These diameters are closer in size to each other than those shown in FIGS. 3 and 4. The splice junction overlap is shown by dimension $L_1$, and gel 502 is shown between the two optical fibers. The dimensions of gel thickness and optical fiber diameter are not necessarily in realistic proportions, but are depicted as such to enhance clarity of presentation.

Figure 6:
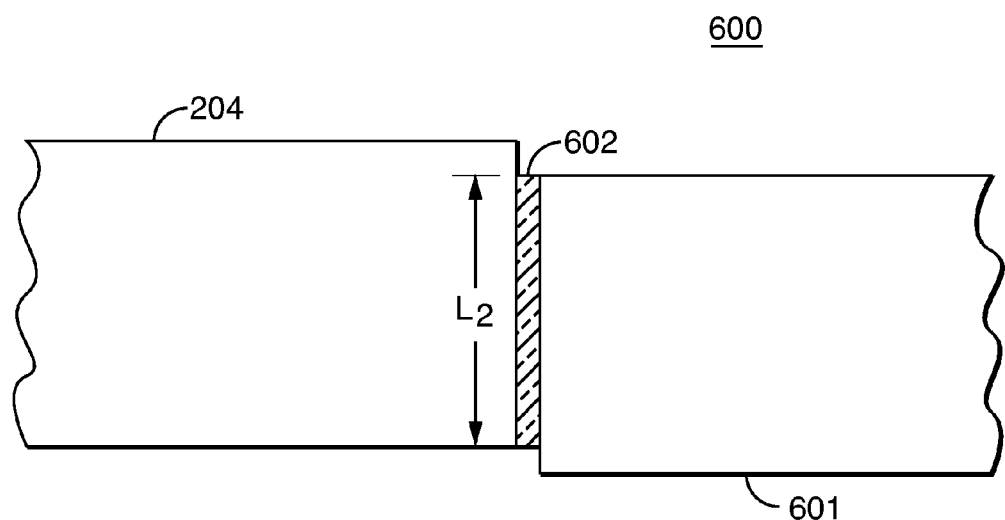

FIG. 6 is an exemplary schematic diagram depicting a longitudinal view of the two optical fibers having the same size as those of FIG. 5 as they might be supported by apparatus of FIG. 2. Optical fiber 204 has the same diameter as optical fiber 104; optical fiber 601 has the same diameter as optical fiber 501; gel 602 is used. The overlap is shown by dimension $L_2$. $L_2$ is larger than $L_1$. The dimensions of gel thickness and optical fiber diameter are again not necessarily in realistic proportions, but are depicted as such to enhance clarity of presentation.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow.

Figure 7:
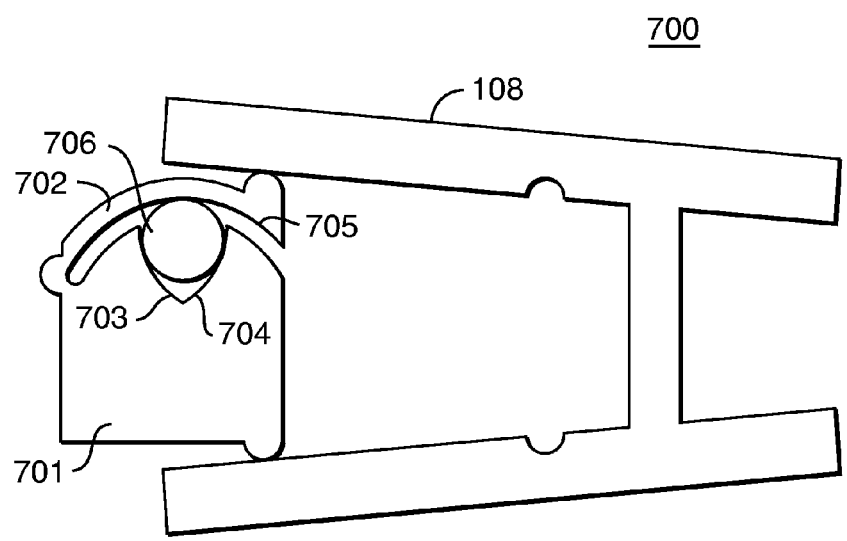
FIG. 7 is an exemplary end view schematic diagram of an alternative embodiment of the present invention.

For example, FIG. 7 depicts an alternative embodiment 700 of the present invention. FIG. 7 is similar to FIG. 2 with the exception of the design of cover 702. Splicer body 701 has equally curved walls 703 and 704 formed therein, similar to side walls 202 and 203, respectively, in FIG. 2. But, rather than having an inner surface 207 formed in cover 205, that inner surface having the same radius of curvature (and virtually the same arc length) as those of side walls 202 and 203 as shown in FIG. 2, FIG. 7 shows an extended curved ceiling 705 or a continuously curved inner cover ceiling 705. That continuous curve runs from near the hinge at the left hand side of cover 702 to near the end of the cover at the right hand side of cover 702. The curvature of the curved inner cover ceiling 705 is the same as the curvature of the arcs 703 and 704.

The purpose of the alternative embodiment is to accommodate small variations in dimensions resulting from variations in the manufacturing process, when fabricating the embodiments of the present invention. The splicer body and cover can be stamped from aluminum, where the location and configuration of walls 202/203 or 703/704 in the body is precisely repeatable, but there could be some variation in cover/body alignment when the cover closes upon the splicer body. That is, the embodiment configured in accordance with FIG. 2 requires manufacturing techniques offering virtually perfect repeatability from manufactured unit to unit, in terms of all three of the splicer's arc and linear dimensions and in terms of hinge action. Without that level of repeatability, an end of arc 207 in cover 205 of FIG. 2 making unwanted contact with glass fiber 204 might cause an unwanted displacement of the glass fiber. The cover 205 must mate virtually perfectly and, if linearly offset relative to body 201, the otherwise achievable optimum alignment cannot be achieved.

But, in the alternative embodiment, with a continuous arcuate inner cover ceiling 705, similar slight displacements or similar slight variations in tolerance will be mitigated because the arc is continuous and without an end point in the vicinity of optical fiber 706. If the cover is displaced slightly from optimum setting, the cover still presents virtually the same arc to the optical fiber that is encapsulated. Clamp 108 in FIG. 7 operates with respect to this embodiment as described above with respect to FIG. 1. As with FIG. 2, the gap between the lower surface 705 of cover 702 and the upper surface of body 701 can be larger or smaller than the gap shown; the actual gap distance is a function of diameter, or radius, of optical fiber 706 relative to radius of curvature of 703, 704 and 705.

The present invention is thus not to be interpreted as being limited to particular embodiments and the specification and drawings are to be regarded in an illustrative rather than restrictive sense.

What is claimed is:

1. An improved optical-fiber mechanical splicer, the improvement comprising:
   two curved restraining walls formed in said splicer and having substantially equal radii of curvature, said walls meeting together at one end thereof to form a linear channel having concave walls for securely supporting two separate optical fibers having unequal diameters in said channel for mechanical splicing purposes; and
   a cover, hinged at one end of said cover from said splicer, said cover including a cover arc formed therein having said radius of curvature and configured to firmly hold one of said fibers having the larger of said two unequal diameters within concave constraints of both said channel and said cover arc when said cover is locked closed;
   whereby said improvement provides greater overlap between cross-sections of said optical fibers at mechanically-spliced ends of said fibers than otherwise obtained via flat restraining walls and flat cover, said greater overlap reducing insertion loss at said spliced ends.

2. The improvement of claim 1 wherein said insertion loss is reduced by at least 0.1 dB.

3. The improvement of claim 1 wherein said two curved restraining walls and said cover arc all have the same arcuate length.

4. The improvement of claim 1 wherein said two curved restraining walls have the same arcuate length and said cover arc spans said cover continuously from said one end of said cover to an end of said cover opposite said one end.

5. Apparatus, comprising:
   a chassis;
   two curved surfaces formed in said chassis, said curved surfaces having substantially equal radii of curvature and meeting at one end of each of said surfaces to form a linear and concave open channel within said chassis for purposes of supporting two optical fibers in said channel at the location of an intended splice-interface between said two optical fibers; and
   a curved cover having said radius of curvature and configured to have the concave side of said cover fixedly close upon at least one of said optical fibers thereby forming a three-concave-sided closed channel enveloping said splice-interface to permit mechanical splicing-together of said two optical fibers.

6. The apparatus of claim 5 wherein said radius of curvature is between two and three times the radius of curvature of said optical fibers.

7. The apparatus of claim 6 wherein said chassis is constructed of metal and/or hard plastic.

8. The apparatus of claim 7 wherein said metal is aluminum.

9. A method for reducing insertion loss generated by a mechanically-spliced interface between two optical fibers having different diameters, said method comprising:
   increasing overlap between cross-sections of said two optical fibers at a splice junction of said two optical fibers by mechanically splicing-together said two optical fibers in apparatus comprising:
      a chassis;
      two curved surfaces formed in said chassis, said curved surfaces having substantially equal radii of curvature and meeting at one end of each of said surfaces to form a linear and concave open channel within said chassis to support said two optical fibers including said splice junction in said channel; and
      a cover having a curved surface with said radius of curvature formed in said cover and configured to have the concave side of said cover fixedly close upon one of said two optical fibers having a larger diameter, thereby forming a three-concave-sided closed channel enveloping said splice-interface to permit mechanical splicing-together of said two optical fibers while enveloped within said three-concave sided closed channel.

10. A method, comprising:
    splicing together two optical fibers having unequal diameters in a mechanical optical-fiber splicer apparatus having a closed splice-junction support channel, said closed channel configured with three concave surfaces which together securely hold one of said fibers having the larger diameter.

11. The method of claim 10 further comprising:
    utilizing said three concave surfaces to increase overlap between cross-sections of said two optical fibers at said splice junction with concomitant reduction of insertion loss generated by said splice junction as compared with loss obtained from other apparatus having a closed splice junction support channel configured with three flat surfaces.

* * * * *